United States Patent [19]

Lackner et al.

[11] Patent Number: 4,809,540

[45] Date of Patent: Mar. 7, 1989

[54] METHOD AND APPARATUS FOR TESTING INTERNAL COMBUSTION ENGINES

[75] Inventors: Gerald Lackner; Heimo Denk, both of Graz, Austria

[73] Assignee: AVL Gesellschaft für Verbrennungskraftmaschinen und Messtechnik mbH., Prof.Dr.DR.h.c.Hans List, Austria

[21] Appl. No.: 124,587

[22] Filed: Nov. 24, 1987

[30] Foreign Application Priority Data

Nov. 25, 1986 [AT] Austria ................................ 3150/86

[51] Int. Cl.[4] .......................................... G01M 15/00
[52] U.S. Cl. ..................................... 73/117.2; 73/115
[58] Field of Search .................... 73/117.3, 117.2, 116, 73/119 A, 115

[56] References Cited

U.S. PATENT DOCUMENTS

| | | | |
|---|---|---|---|
| 3,952,586 | 4/1976 | Hanson et al. | 73/117.2 |
| 4,062,232 | 12/1977 | Sutphin, Jr. | 73/117.2 |
| 4,309,900 | 1/1982 | Kreft et al. | 73/117.2 |

FOREIGN PATENT DOCUMENTS

| | | |
|---|---|---|
| 313607 | 2/1974 | Austria . |
| 2709128 | 8/1978 | Fed. Rep. of Germany . |
| 2509199 | 2/1980 | Fed. Rep. of Germany . |

Primary Examiner—Jerry W. Myracle

[57] ABSTRACT

In a method and apparatus for the evaluation of a starter motor current or of a magnitude proportional to it for determining the relative compressions of the cylinders of an internal combustion engine, in order to eliminate the distortion of the compression relationships between the individual cylinders, account is taken of the current/speed characteristic of the starter motor. Using a direct current series motor as the starter, from the starter current there is derived a magnitude N proportional to the actual speed according to the relationship $N = 1/i + k*i$ where i is the motor current. The correction factor K serves to take account of the departure of the characteristic from a hyperbolic curve.

15 Claims, 2 Drawing Sheets

4,809,540

METHOD AND APPARATUS FOR TESTING INTERNAL COMBUSTION ENGINES

BACKGROUND

1. Field of the Invention

The invention relates generally to a method of testing an internal combustion engine and particularly to a method and apparatus for determining the relative compressions of the cylinders of an engine; the starter motor current or an electrical magnitude proportional to it being evaluated while the ignition is suppressed.

2. Prior Art

A method and apparatus for evaluating the relative compressions of cylinders of an internal combustion engine is disclosed in German Patent No. AS 2 709128. In this disclosure the current in the starter motor is employed as a measure of the variation in pressure in the individual cylinders with the ignition suppressed during the period of measurement. The measured current or an electrical magnitude proportional to it has superimposed on it a varying component which arises from the pulsating opposing torques on the crankshaft as each cylinder undergoes a compression stroke and an expansion stroke during the starting process performed with the ignition suppressed. Accordingly, it allows a comparison of the compressions of the individual cylinders.

This known method has a serious drawback which lies in the fact that, in the measured starter motor current or the electrical magnitude proportional to it, the influences of the individual cylinders of the engine are not in proportion. For example, when a cylinder has a poor compression, it can arise that in the cylinder which follows it in the engine cycle, an excess of current is used to cause compression in that following cylinder which results in a distortion of the relative difference in compression measurements between the two cylinders. Accordingly, the difficulty in locating a fault and overcoming it increases.

In the above-mentioned German patent, to correct the effects of this disproportionate representation in the evaluation of the measurements, an adjustment is made whereby the integral value of the alternating portion of the starter motor current is calculated by integrating along a time axis connecting the minima. Then, to correct matters, the difference between the integral value of a complete cycle and the integral value of the current draw curve up to the preceding cylinder is added to these integral values with its sign reversed. In this way, account is taken of the theory that the above-mentioned error arises through a loss in the amount of work stored in the compressed air; i.e., when a cylinder has a deficient compression, the next following cylinder in the engine cycle needs an increase in the starter motor current because part of the energy stored in the air which should have been compressed in the preceding cylinder is lacking as a consequence of the poor compression. However, it has been shown that even using the stated adjustment of the known method it has not been possible to achieve satisfactory accuracy or reliability in measurements on different engines and in measuring normal operation.

SUMMARY OF THE INVENTION

The present invention provides a method and apparatus for determining the relative compressions of internal combustion engine cylinders which compensates and corrects for the errors induced by false readings produced in connection with a normal functioning cylinder which follows a cylinder with low or poor compression. Moreover, the invention enables the use of battery voltage measurements which allows for a simple and inexpensive method which is reasonably accurate for diagnostic purposes.

It is an object of the present invention to achieve an improvement over a known method of the kind stated above in the measurement of relative compressions in an internal combustion engine so that, in a measurement carried out in a manner which is simple and which is equally suitable for a wide range of engines to be tested, meaningful and accurate compression values of the individual cylinders can be obtained.

This object is achieved according to the invention in that, to eliminate distortions of the compression relationships of the individual cylinders in the evaluation of the starter motor current or of a magnitude proportion to it, account is taken of the current/speed characteristic of the starter motor. Thus, the invention is based on the unexpected discovery that the above-mentioned unequal representation of the influences of the individual cylinders can be traced not, as previously assumed, mainly to a loss in the work stored in the compressed air, but mainly to the influence of the non-linear current/speed characteristic of the starter motor. The pulsating opposing torques of the compressing and expanding cylinders during the starting process produce variations in the speed of the motor; but as a consequence of a non-linear current/speed characteristic a given variation in speed by an amount n causes different magnitudes of variation in the current i at different absolute values of the speed. Therefore, the non-specific effects of the starter motor itself on the individual cylinders can be overcome in a simple manner and useful measurements are assured.

According to another feature of the invention, it is provided that where a direct current series-connected motor is used as the starter motor, in the initial evaluation, from the starter motor current i or from a magnitude proportional to it the magnitude proportional to the actual speed is derived according to the relationshp $N=1/i+K*i$ where the correction factor K serves to take account of the departure of the current/speed characteristic of the starter motor from a true hyperbolic curve and the amplitudes of the alternating portion corresponding to the compression values are derived from this magnitude N. For various reasons the direct current series-connected motor is currently the kind of motor most widely employed in all internal combustion engines provided with electric starters. By the above-mentioned feature of the invention, the invention is made applicable to the greater proportion of all the engine tests which are carried out. The correction factor K can be determined according to the measured result for a particular kind of engine to be tested, or a mean value which is suitable for a spectrum of different types can be determined. The correction factor K can take both negative and positive values.

For error correction in the stated manner it is therefore necessary to measure or determine both the alternating part and the direct part of the starter motor current, although they only need to be measured in relation to one another and not in their absolute values. Thus, the expensive technique of current measurement may be replaced by a voltage measurement on the battery.

Hence, according to a further feature of the invention, the terminal voltage of the battery which supplies the starter motor is measured while the motor is operating and such measurement is subtracted from the open-circuit voltage measured before operation of the starter. The resulting measurement is representative of the current draw of the motor. While it is true that this brings with it a slight deficiency in the accuracy of the measurement of the starter motor current draw, it also brings with it a significant reduction in the cost of doing it.

An aspect of the invention is an apparatus for carrying out the method of determining the relative compressions of the cylinders of an internal combustion engine with a breaker unit for interrupting the ignition of the engine, a pick-up unit for picking up the starter motor current of the engine and an evaluating unit connected to the pick-up unit for evaluating the picked-up signals. The evaluating unit is characterized according to the invention in that the evaluating unit includes a correction unit for taking account of the current/speed characteristic of the starter motor. In this correction unit the above-mentioned magnitude N proportional to the actual speed is generated and its varying amplitude serves as an indication of the compression.

These and other aspects and objects will become apparent by reference to the description of the preferred embodiment and the attached drawings.

DESCRIPTION OF THE PREFERRED EMBODIMENTS

Figure 1:
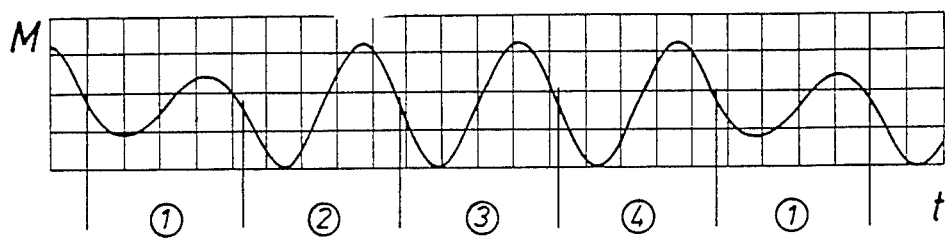
FIG. 1 shows a torque/time graph of the pulsating torque of an engine opposing a starter.
Figure 2:
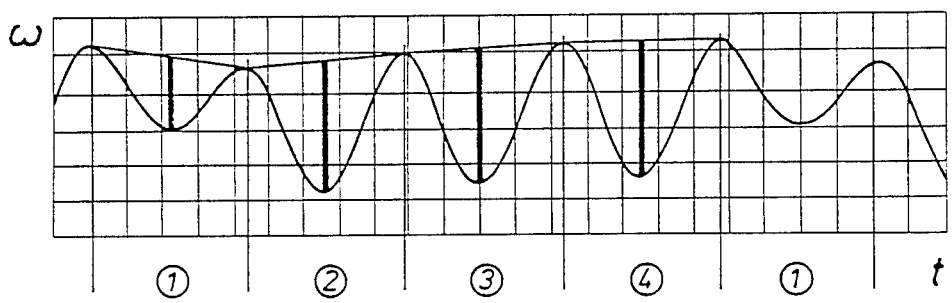
FIG. 2 shows an angular velocity/time graph of an engine opposing a starter associated with FIG. 1.
Figure 3:
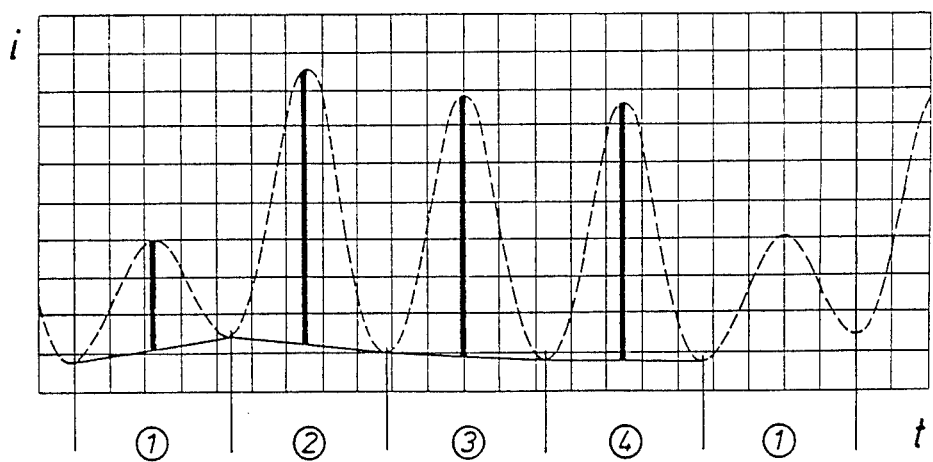
FIG. 3 shows a starter current/time graph of an engine opposing a starter, associated with FIGS. 1 and 2.

The compression pressure of the four cylinders indicated in FIGS. 1 to 3, by the circled numbers 1 to 4 of an internal combustion engine, not illustrated, is represented very well by the amplitudes of a waveform of a pulsating torque M which opposes a starter motor. In FIG. 1, the number one cylinder is shown as having a loss of compression which is indicated by a low torque M opposing the starter.

In FIG. 2, there is illustrated the variation with time of the angular velocity u of the crankshaft of the engine resulting from the variation in torque shown in FIG. 1. The amplitudes shown in FIG. 1 representing the amplitudes of the torque and thereby the compression pressure and indicated in thick lines in the graph of FIG. 2 do not incorporate the systematic error induced in the measurements of the compression values as these cannot be affected by the current/speed characteristic of the starter nmotor.

In the graph of FIG. 3, which shows the starter motor current i in relation to time t, the systematic error is present and one can clearly see the exaggeration of the loss of compression in the poqrly compressing number one cylinder and the increase of current draw in the subsequent number two cylinder. The origin of this exaggeration lies in the non-linear current/speed characteristic of the direct current series motor which is usually employed as an electric starter.

Figure 4:
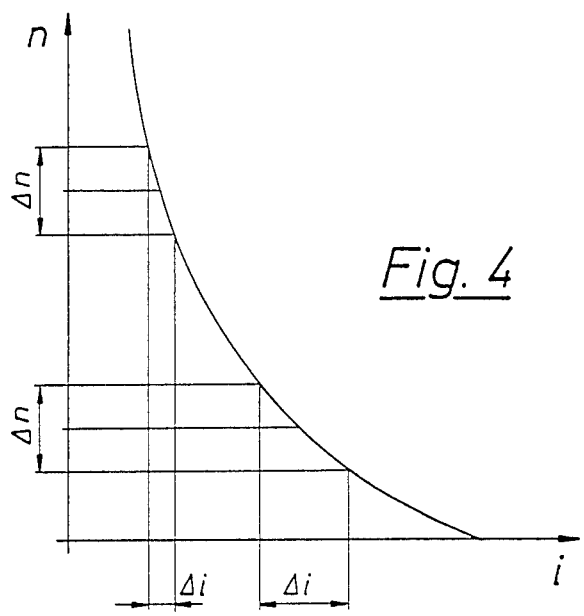
FIG. 4 shows a current/speed characteristic of a direct current series-connected motor.

The current/speed characteristic of such a motor is—ignoring magnetic saturation—a hyperbola (1/i) offset as a consequence of winding resistance as shown in FIG. 4. From FIG. 4 it is seen how the above-mentioned systematic error arises with such a non-linear characteristic; a variation in the speed by the amount $\Delta n$ causes a smaller variation in current $\Delta i$ at a high speed n than at a lower speed. However, this error can be corrected very simply and advantageously because in the derivation of the compression value, a magnitude N is derived which results from the starter current i as follows:

$$N = 1/i + K^*i$$

The correction factor K serves to account for the departure of the starter characteristic from an ideal hyperbolic curve. The correction factor K can be determined according to the measurements made for a particular type of engine to be tested or as a mean value suitable for a spectrum of different types and it can have both negative and positive values.

The amplitudes of the curves of the magnitude N derived in this way are used for determining the relative compressions of the cylinders. For correcting the error in this way, it is therefore necessary to measure the alternating part and the direct part of the starter current i, although they only need to be measured correctly in relation to one another. Knowledge of their absolute values is not necessary. This allows—taking into account a limit on accuracy—the more expensive current measurement of the starter motor current to be replaced by a voltage measurement of the battery which feeds the starter motor. If the measured terminal voltage is subtracted from the open circuit voltage of the battery one obtains a magnitude proportional to the starter current and after carrying out the above-disclosed correction it can be used as well for determining the relative compressions.

Figure 5:
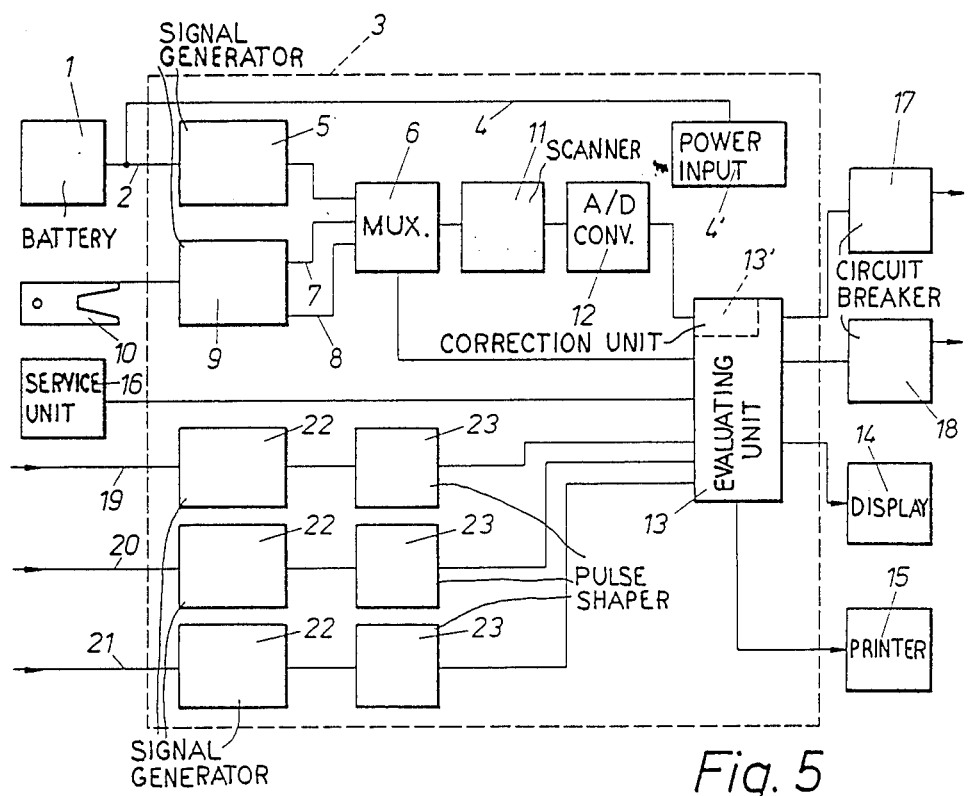
FIG. 5 shows a block circuit diagram of an apparatus embodying principles of the invention for determining the relative compressions of the cylinders of an internal combustion engine according to the invention.

In FIG. 5 there is illustrated a block-circuit diagram of an apparatus for carrying out the method described. Connected to a battery 1 in a manner not illustrated is the starter motor of an internal combustion engine which is to be tested with regard to the relative compressions of its individual cylinders. The battery 1 is connected through leads 2 to a measuring apparatus 3 which is supplied with voltage by the battery 1 through a unit 4' and a lead 4. A signal proportional to the battery voltage is fed to a multiplexer 6 through a signal generator 5. The multiplexer 6 is connected through leads 7 and 8 to a further signal generator 9 which can alternatively be supplied by a tongs-type current meter 10 with a signal corresponding to the starter current. Through the multiplexer 6, the particular signal desired can be selected and then fed through a scanning member 11 and an analog to digital converter 12 of an evaluating unit 13 for further handling in accordance with the method described above. The terminals of the battery 1 and the current measuring tongs 10 as well as the signal generators 5 and 9 together with the subsequently connected units form a pick-up unit for the magnitudes to be measured.

The evaluating unit 13—which can, for example, be formed from a microprocessor—includes also a correction unit 13' which allows one to take into account the current/speed characteristic of the starter motor. In this way the systematic errors which are observed in such compression measurements can be cancelled out in the manner described, which errors would otherwise seriously distort the relative compression difference of the individual cylinders and make it difficult to arrive at clear conclusions in this regard.

Connected to the evaluation unit 13 is an indicating unit 14, for example a liquid crystal display, and a printer 15 for showing the measured values. On this display, in addition to the relative compression values of the individual cylinders of the engine under test, one can display, for example, the starter speed, the mean value of the current, the mean value of the voltage, waviness, et cetera.

Likewise, a service unit 16 is connected to the evaluating unit 13. Through this service unit the various modes of operation of the device and of the measuring apparatus are set and controlled.

The suppression of the ignition in spark-ignition engines is achieved through an interrupter unit 17 in response to a command signal from the appropriate evaluating unit 13. Only one connection to the terminal of the ignition contact breaker, not shown, is needed. To suppress the injection of fuel in diesel engines, the magnetic valve of a fuel injection pump can be shut off by an appropriate interrupter unit 18. On the engine to be tested, the control lead to the magnetic valve can be cut and the unit 18 inserted.

To identify the individual cylinders, i.e., to associate the cylinder-specific amplitudes derived as shown in FIG. 3 with the individual cylinders which give rise to them, the evaluating unit 13, in the case of spark-ignition engines under test, is fed with signals from a capacitive sensor, not illustrated, which is clamped to the ignition lead of a predetermined cylinder through a lead 19. In the case of measurements made on diesel engines, the signals from sensors clamped on the fuel injection pipes for detecting dilation during the injection process are fed to the microprocessor 13 after appropriate shaping through lead 21. However, to the same terminal 21 could also be connected to inductive and Hall effect needle-movement transmitters. In engines with marks provided for the introduction of ignition timing sensors, one of these timing sensors can be connected to the evaluating unit 13 through a lead 20 to allow identification of the cylinder in conjunction with a clamp-on sensor. The signals sent over the signal leads 19, 20 and 21 are appropriately shaped by respective signal generators 22 and pulse shapers 23 inserted ahead of the connections of the leads to the evaluating unit 13.

The measuring sequence for determining the relative compressions of the cylinders of an internal combustion engine will be described briefly in conjunction with the example, in which the identification of the cylinders is achieved by means of sensors clamped on all of the fuel injection pipes. The ignition of the engine is interrupted by the breaker unit 17 or 18, according to the type of engine Insofar as this is not possible, the example, in diesel engines, the adjustment to zero delivery can also be performed by hand by reducing the fuel input until ignition is suppressed. Then, during the subsequent starting process, after the starter motor has reached a steady speed, either the starter motor current or the battery voltage is measured and, simultaneously, the amplitudes of the waves which arise are numbered As soon as a sufficient number of cycles for evaluation has been scanned, the suppression of the ignition is ceased and the above-mentioned sensors produce their corresponding signals. Using these signals, the above-mentioned numbering of the amplitudes associated with the individual cylinders is continued until the arrival of the signal from that sensor which is identified with a particular selected cylinder, preferably the number one cylinder With a knowledge of the number of cylinders and the firing order, the derived current or voltage amplitudes can be allocated to the individual cylinders.

Thus, a method and apparatus are provided for inexpensively and sufficiently accurately determining the relative compressions of cylinders of an internal combustion engine using the battery voltage or starter motor current characteristics induced when crankshaft torque forces which oppose the starter motor when ignition is suppressed. While a preferred embodiment has been described, modifications will be apparent to those skilled in the art which fall within the scope and spirit of the invention. It is intended that the attached claims cover these modifications.

We claim:

1. A method for testing relative compressions of cylinders of an internal combustion engine comprising the steps of:
   suppressing ignition of an internal combustion engine;
   deriving a representation of current draw through a starter motor as said motor is used to turn over said engine with said ignition suppressed; and
   eliminating distortions of compression relationships of cylinders of said engine represented by said representation of said current draw by compensating for a current/speed characteristic of said motor.

2. A method as set forth in claim 1, wherein said step of eliminating distortions includes calculating a magnitude proportional to a speed of said motor according to a hyperbolic relationship, wherein said magnitude is equal to the inverse of a motor current measurement summed with the current draw measurement multiplied by a correction factor, the correction factor serving to account for departure of the current/speed characteristic from the hyperbolic relationship, and to derive an alternating portion from said magnitude representative of said cylinder compressions.

3. A method as set forth in claim 2, wherein said step of obtaining a representation of said starter motor current draw includes measuring a voltage across terminals of a battery supplying current to said starter motor and subtracting same from a measurement of an open circuit voltage taken before operation of the starter motor.

4. An apparatus for testing relative compressions of cylinders of an internal combustion engine comprising:
   means for deriving a signal representative of a current draw through a starter motor used to turn over an internal combustion engine with said engine's ignition being suppressed;
   means for interrupting said ignition to thereby suppress ignition of said engine;
   means for evaluating said signal coupled to said means deriving said signal;
   means for compensating for a current/speed characteristic of said motor;
   means for deriving a signal representative of relative compressions of cylinders of said engine; and
   means for identifying compression representations for each cylinder of said engine and matching said compression representations to respective cylinders.

5. An apparatus as set forth in claim 4 wherein said means for compensating for the current/speed characteristic of said motor includes means for deriving a magnitude proportional to a speed of said motor according to a hyperbolic relationship whereby said magnitude is equal to the inverse of a measure of said motor current draw summed with the measure of said current draw multiplied by a correction factor, said correction factor accounting for a departure of said current/speed characteristic from the hyperbolic relationship.

6. An apparatus as set forth in claim 4 including means for identifying compression representations for each cylinder of said engine and for matching each representation to its respective cylinder.

7. An apparatus as set forth in claim 6 wherein said means for identifying compression representations for each cylinder includes means for detecting ignition in a predetermined cylinder.

8. An apparatus as set forth in claim 7, wherein said means for evaluating said signal and means for compensating for said current/speed characteristic of said motor are contained within a microprocessor unit.

9. An apparatus as set forth in claim 4 wherein said means for deriving a signal representative of said motor current draw includes means for measuring a closed circuit voltage across a battery supplying current to said motor, means for measuring an open circuit voltage across said battery when said motor is not in operation, and means for subtracting said closed circuit voltage measurement from said open circuit voltage to produce said signal.

10. An apparatus for testing relative compressions of cylinders of an internal combustion engine comprising:
means for deriving a signal representative of a current draw through a starter motor used to turn over an internal combustion engine with said engine's ignition being suppressed;
means for evaluating said signal coupled to said means deriving said signal;
means for compensating for a current/speed characteristic of said motor;
means for deriving a signal representative of relative compressions of cylinders of said engine; and
means for identifying compression representations for each cylinder of said engine and matching said compression representations to respective cylinders.

11. An apparatus as set forth in claim 10 wherein said means for compensating for the current/speed characteristic of said motor includes means for deriving a magnitude proportional to a speed of said motor according to a hyperbolic relationship whereby said magnitude is equal to the inverse of a measure of said motor current draw summed with the measure of said current draw multiplied by a correction factor, said correction factor accounting for a departure of said current/speed characteristic from the hyperbolic relationship.

12. An apparatus as set forth in claim 10 including means for identifying compression representations for each cylinder of said engine and for matching each representation to its respective cylinder.

13. An apparatus as set forth in claim 12, wherein said means for identifying compression representations for each cylinder includes means for detecting ignition in a predetermined cylinder.

14. An apparatus as set forth in claim 13, wherein said means for evaluating said signal and means for compensating for said current/speed characteristic of said motor are contained within a microprocessor unit.

15. An apparatus as set forth in claim 10 wherein said means for deriving a signal representative of said motor current draw includes means for measuring a closed circuit voltage across a battery supplying current to said motor, means for measuring an open circuit voltage across said battery when said motor is not in operation, and means for subtracting said closed circuit voltage measurement from said open circuit voltage to produce said signal.

* * * * *